United States Patent
Glahn et al.

(10) Patent No.: US 7,098,555 B2
(45) Date of Patent: Aug. 29, 2006

(54) INTELLIGENT POWER DISTRIBUTION MANAGEMENT FOR AN ON-BOARD GALLEY OF A TRANSPORT VEHICLE SUCH AS AN AIRCRAFT

(75) Inventors: Wolfgang Glahn, Hamburg (DE); Gerd Dueser, Jork (DE); Axel Koenig, Hamburg (DE); Mathias Finck, Hamburg (DE); Joerg Reitmann, Harsefeld (DE)

(73) Assignee: Airbus Deutschland GmbH, Hamburg (DE)

( * ) Notice: Subject to any disclaimer, the term of this patent is extended or adjusted under 35 U.S.C. 154(b) by 309 days.

(21) Appl. No.: 10/634,661

(22) Filed: Aug. 4, 2003

(65) Prior Publication Data

US 2004/0057177 A1 Mar. 25, 2004

(30) Foreign Application Priority Data

Aug. 2, 2002 (DE) .............................. 102 35 600

(51) Int. Cl.
*H02J 1/00* (2006.01)
*H02J 3/00* (2006.01)

(52) U.S. Cl. ......................................... 307/32; 307/31
(58) Field of Classification Search .................. 307/32, 307/31
See application file for complete search history.

(56) References Cited

U.S. PATENT DOCUMENTS

| 4,403,292 | A |  | 9/1983 | Ejzak et al. |
| 4,730,089 | A |  | 3/1988 | Pepper |
| 4,967,096 | A |  | 10/1990 | Diemer et al. |
| 5,414,640 | A |  | 5/1995 | Seem |
| 5,594,285 | A |  | 1/1997 | Wisbey et al. |
| 5,612,579 | A |  | 3/1997 | Wisbey et al. |
| 5,637,933 | A |  | 6/1997 | Rawlings et al. |
| 5,729,059 | A |  | 3/1998 | Kilroy et al. |
| 5,796,628 | A | * | 8/1998 | Chiang et al. .............. 700/295 |
| 5,927,598 | A |  | 7/1999 | Broe |
| 5,936,318 | A |  | 8/1999 | Weiler et al. |
| 6,441,565 | B1 |  | 8/2002 | Levy |
| 6,465,908 | B1 | * | 10/2002 | Karuppana et al. ........... 307/31 |
| 6,744,149 | B1 | * | 6/2004 | Karuppana et al. ........... 307/31 |
| 6,921,987 | B1 | * | 7/2005 | Marin-Martinod ........... 307/32 |
| 2005/0013075 | A1 |  | 1/2005 | Kohlmeier-Beckmann et al. |

FOREIGN PATENT DOCUMENTS

| DE | 19507039 | 10/1995 |
| DE | 195 02 786 | 8/1996 |
| DE | 195 16 906 | 11/1996 |
| DE | 198 17 191 | 10/1999 |
| GB | 1 550 677 | 8/1979 |

* cited by examiner

*Primary Examiner*—Lynn D. Feild
*Assistant Examiner*—Michael Rutland-Wallis
(74) *Attorney, Agent, or Firm*—W. F. Fasse; W. G. Fasse

(57) ABSTRACT

In an aircraft galley, a power network distributes power from a source to electrical consuming devices (oven, water boiler, coffee machine, trash compactor, etc.). A control unit is connected to and can individually address each of the devices via a databus. The control unit compares the actual existing power consumption to a prescribed maximum value. If the actual consumption reaches the maximum value, the control unit calls up a power reduction procedure from a catalog in a database, and provides corresponding control signals to one or more of the devices to reduce the power consumption below the maximum value. The individual devices receive power in a time-sharing, power-sharing, or time-staggered manner. An intelligent distribution of available power resources avoids power overloads, and allows optimal utilization of all galley devices without limiting the normal catering process.

23 Claims, 5 Drawing Sheets

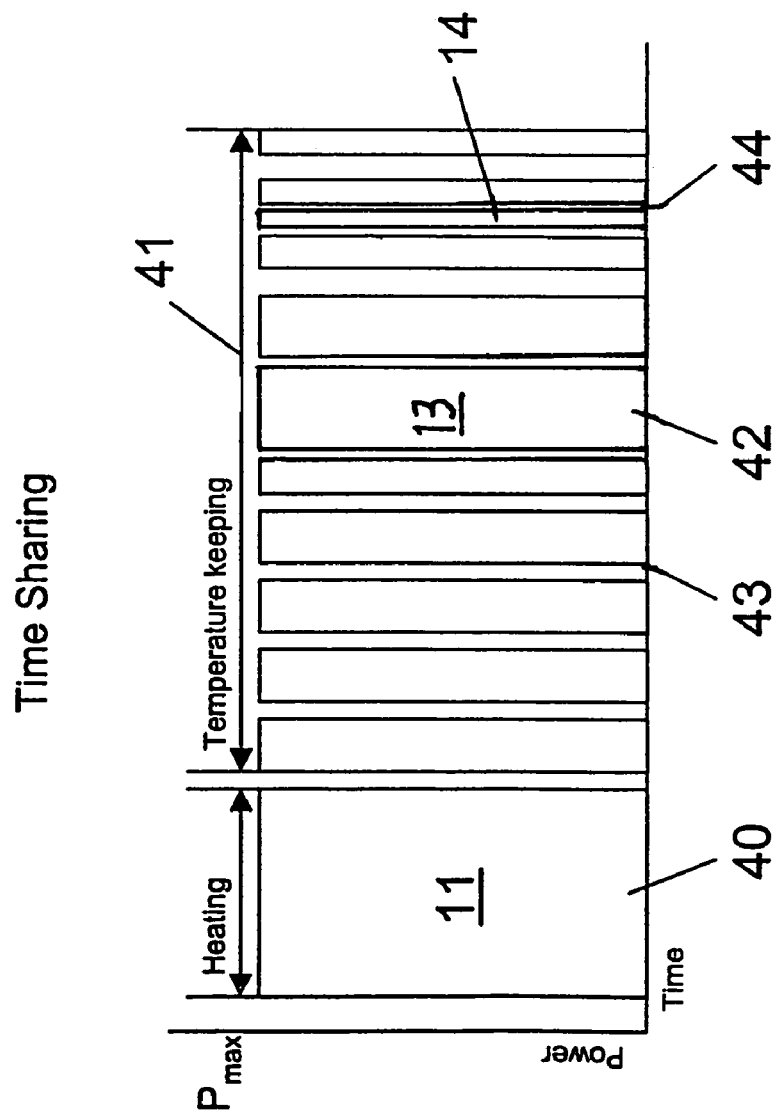

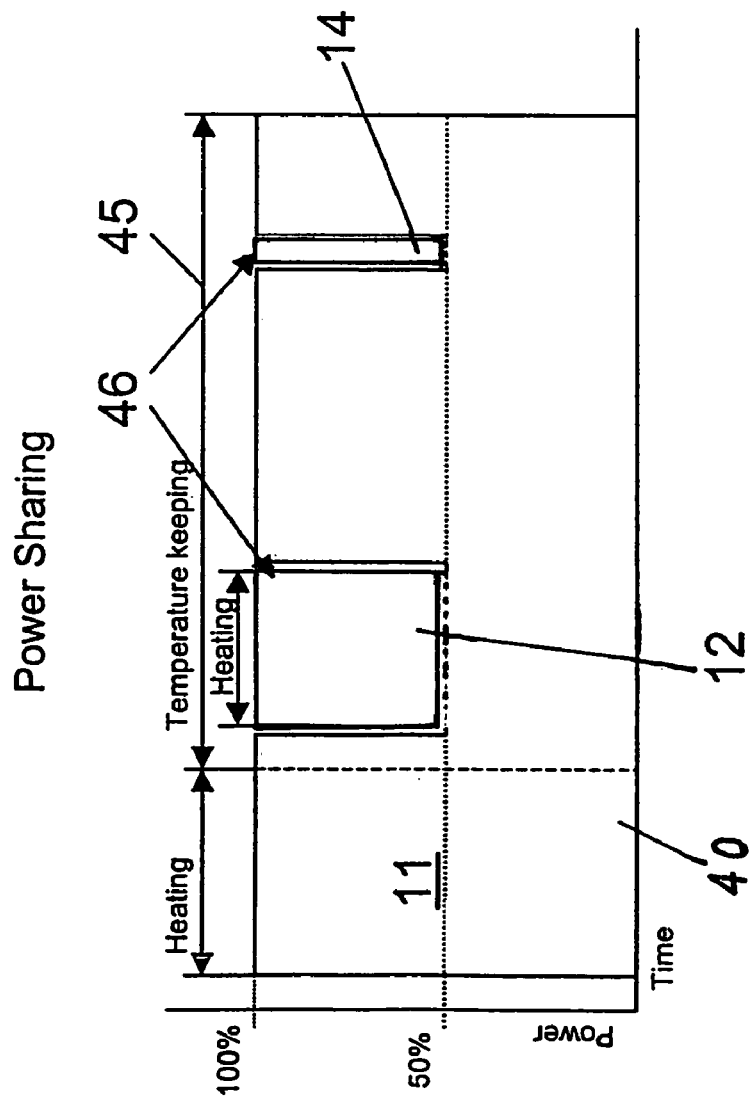

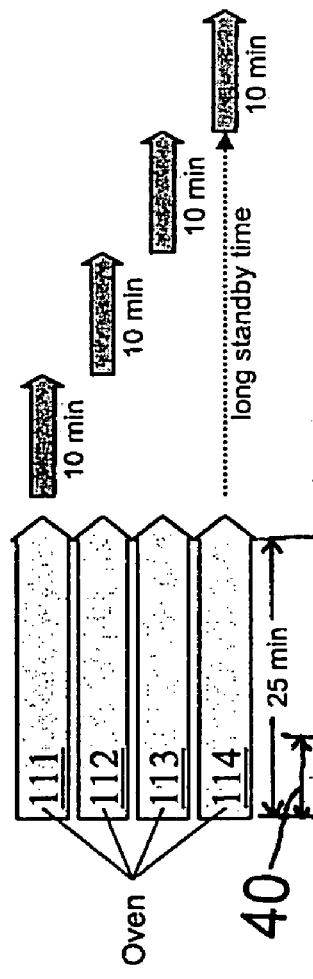
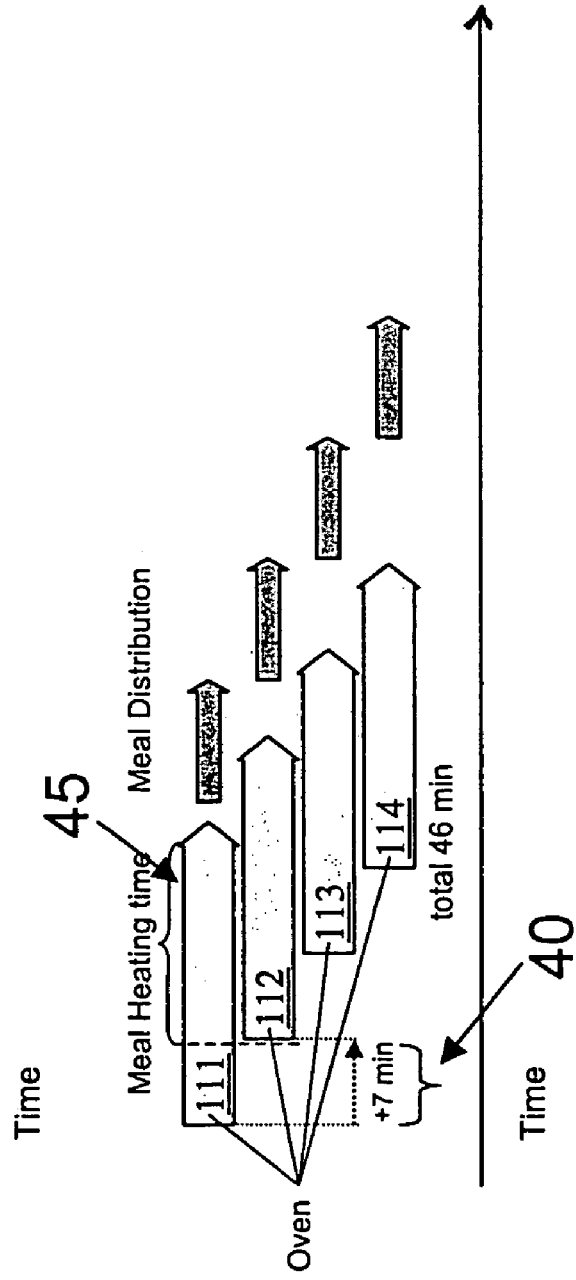

INTELLIGENT POWER DISTRIBUTION MANAGEMENT FOR AN ON-BOARD GALLEY OF A TRANSPORT VEHICLE SUCH AS AN AIRCRAFT

PRIORITY CLAIM

This application is based on and claims the priority under 35 U.S.C. §119 of German Patent Application 102 35 600.9, filed on Aug. 2, 2002, the entire disclosure of which is incorporated herein by reference.

FIELD OF THE INVENTION

The invention relates to a method and an arrangement for supplying power to an on-board galley or kitchen of a passenger transport vehicle, especially an aircraft, including a power source and a power distribution network connected to electrical consuming devices, as well as a control unit that controls the distribution of power to the devices.

BACKGROUND INFORMATION

Modern passenger transport aircraft typically include one or more on-board galleys outfitted with one or more electrical power consuming devices, such as ovens, water boilers, coffee machines, trash compactors, and the like. A power line network or branched feeder system receives power from the electrical system of the aircraft and distributes the electrical power to the various connected electrical consuming devices. In this regard, the power supply or distribution network is designed and laid out, so that all of the connected electrical consuming devices of the on-board galley can be operated at full power, i.e. full load, at any desired time, which means that the capacity of the power distribution network must be sufficient to simultaneously provide full power to all of the electrical consuming devices. This is rather inefficient, because in actual practice, the simultaneous full-load utilization of all of the electrical consuming devices arises only rarely in exceptional situations.

Also, such a design and lay-out of the power distribution network requires that the total sum of the connected loads of all of the installed power consuming devices of the on-board galley must always be smaller than the available supply power or connection power of the respective galley power supply system. In other words, the power supply system and its components are laid out for the worst-case all-devices-at-full-load situation, even though this situation would arise only rarely, if at all. This results in unnecessary weight, complexity, and cost of the power supply system and its components.

Especially in future applications in aircraft, in which the number of installed electrical power consuming devices or loads will increase, the conventionally designed power supply and distribution networks will no longer be suitable and able to ensure that all electrical devices will be adequately supplied with electrical power from the available limited electrical energy supply on-board the aircraft. In the field of electrical power consuming installations in aircraft, it is always a critically important consideration, that the available supply of electrical power is strictly limited, rather costly, and always a trade-off with respect to other power consumption in the total energy budget of the operation of the aircraft.

In future situations involving a greater number of electrical devices, it could be attempted, for example, to provide mechanical selector switches that provide an "OR coupling" of two or more electrical devices, whereby always only one of the electrical devices may be selected for operation at any one time by mechanically actuating the selector switch. Alternatively, it would be necessary to provide additional power distribution lines to supply the additional required power to the on-board galley, but this would increase the total dead weight of the aircraft, and would also increase the cost and complexity of the power supply system and potentially over-crowd the spatially limited power supply conduits or raceways.

German Patent Publication DE 195 07 039 A1, as well as U.S. Pat. No. 5,637,933 disclose an energy or power supply system that comprises a power bus as well as several electrical consuming devices connected by connector arrangements to the power bus. Furthermore, the known system includes a control unit, which constantly monitors the electrical consuming devices, and can correspondingly react in the event a faulty or erroneous operation or malfunction of a given device is recognized. Particularly, in the event of a malfunction or erroneous operation, or in the event of an excessive power consumption, the control unit can switch off the electrical consuming device that has the lowest supply priority. For this purpose, each one of the electrical consuming devices is equipped with a configuration code transducer, which contains or provides, for example, an information regarding the type of the electrical consuming device as well as its priority in the power supply scheme. In the event a fault, error, or malfunction in the power source leads to a reduction of the available power being supplied, the control unit sends a signal to the corresponding associated power switch of the electrical consuming device having the lowest priority, so as to switch off this lowest-priority device and thereby reduce the total power consumption of the total electrical system.

Thus, according to the prior art, the only possibility for reducing the total power consumption of the electrical system is to completely switch-off or remove one or more devices from the power supply system. That, of course, significantly detracts from the functionality and user-friendliness of the kitchen devices installed in the galley, because one or more of the devices will become totally inoperable when the overall galley is operating at or near full electrical load. This is especially inconvenient for the users of the galley, because such situations of high electrical load can arise especially when the users of the galley rely on and need the full functionality of all of the devices, for example during meal catering phases of a flight of the aircraft. It is just at such high utilization periods that the flight attendants or other personnel using the galley may find that one or more of the electrical consuming devices in the galley have been automatically switched off to avoid a power overload.

SUMMARY OF THE INVENTION

In view of the above, it is an object of the invention to provide a power supply and distribution arrangement and method of the above described general type, for supplying electrical power to an aircraft galley, which avoid the need of completely switching off one or more electrical consuming devices while still preventing an overload of the total electrical supply capacity. Thereby, the invention aims to improve the user friendliness and full operability of the various electrical consuming devices installed in the galley on-board an aircraft. It is another object of the invention to reduce the required total power supply capacity of the power supply and distribution system relative to the total installed load of all of the energy consuming devices, while also reducing the complexity and weight of the required power distribution network. The invention further aims to avoid or overcome the disadvantages of the prior art, and to achieve additional advantages, as apparent from the present specification.

The above objects have been achieved according to the invention in an electrical energy or power supply arrangement for an on-board galley of a passenger transport aircraft, including a current source or in general an electrical power source, a plurality of electrical consuming devices, a power distribution network connecting the power source to the consuming devices, and a control unit that is connected by a databus and data distribution lines with each individual consuming device, whereby a respective associated address or addressing code is allocated individually to each consuming device. Especially further according to the invention, the control unit carries out a continuous or repetitive comparison of the actual presently existing current consumption with a prescribed maximum current consumption value. When the actual presently existing current consumption reaches the maximum current consumption value, the control unit calls up a catalog of power management measures or procedures from a connected database or databank. The control unit then transmits control signals corresponding to particular measures or procedures from the procedures catalog to at least one of the electrical consuming devices via the databus and the respective data distribution line. The particular devices are selected by the respective allocated addressing codes. As a result thereof, the consuming device or devices then operate in accordance with the prescribed measures or procedures (e.g. switching on or off, or reducing power consumption) so as to avoid overloading the electrical power supply capacity of the power supply arrangement, while still enabling the operability of preferably all of the devices, with essentially no impairment or only minimal impairment of the functionality of the respective device being apparent to the user thereof.

The above objects have further been achieved according to the invention in a method for distributing electrical power in a power supply arrangement including plural electrical consuming devices connected to a power distribution network and to a control unit. The inventive method involves a continuous or repetitive running comparison of the actual presently existing current consumption with a prescribed maximum current consumption value. When the actual presently existing current consumption reaches the prescribed maximum current consumption value, one or more power management measures or procedures are called up from a stored catalog, and control signals corresponding to these procedures are transmitted to one or more addressed ones of the electrical consuming devices. In response to receiving the control signals, the respective addressed electrical consuming devices are switched on or switched off or switched to a reduced power operating state.

In particular preferred embodiments of the apparatus and the method according to the invention, the various electrical consuming devices installed in the on-board galley are supplied with electrical power in a manner that allows all of the devices to be utilized, without overloading the power supply capacity of the power distribution arrangement, even if the sum total of the maximum operating load of all of the devices would exceed the power supply capacity of the power supply arrangement. This is achieved by supplying power to the various devices in an interleaved, overlapping, or staggered manner, i.e. by means of so-called time-sharing, power-sharing, or peak compression of the available power resources. Time-sharing involves intermittently switching off a first device, while switching on a second device during the switched-off phases of the first device. Power-sharing involves intermittently or temporarily reducing the power provided to a first device, while supplying the resulting available extra power to a second device. Peak compression involves staggering the switch-on time of several devices to reduce peak consumption loads that would arise by switching on these several devices all at once, while also avoiding or reducing unnecessary over-consumption of power.

It is especially advantageous that the inventive arrangement and method achieve an intelligent distribution and management of the available electrical power resources, while also enabling the user of the aircraft galley to optimally utilize all of the available installed devices. With the inventive arrangement and method, it is not necessary to completely switch-off certain devices, which would interrupt or interfere with the orderly progress of a meal catering cycle. A temporary power reduction or on-off cycling of the power provided to a given electrical consuming device would possibly not even be noticed by the user of the galley, or at least would be considered as unproblematic.

BRIEF DESCRIPTION OF THE DRAWINGS

In order that the invention may be clearly understood, it will now be described in connection with example embodiments thereof, with reference to the accompanying drawings, wherein:

FIG. 3 is a schematic diagram of power versus time, to illustrate the time progression of a power distribution with "time-sharing" of the power resource, according to a first embodiment;

FIG. 4 is a schematic diagram of power versus time similar to FIG. 3, but showing the time progression of power distribution with "power-sharing" of the power resource, according to a second embodiment; and FIGS. 5A and 5B are schematic diagrams representing the operation of four ovens over time, in connection with the meal distribution in a meal service or catering phase, respectively conventionally without "peak compression" in FIG. 5A, and with "peak compression" by means of staggered operation according to the invention in FIG. 5B.

DETAILED DESCRIPTION OF A PREFERRED EXAMPLE EMBODIMENT AND OF THE BEST MODE OF THE INVENTION

Figure 1:
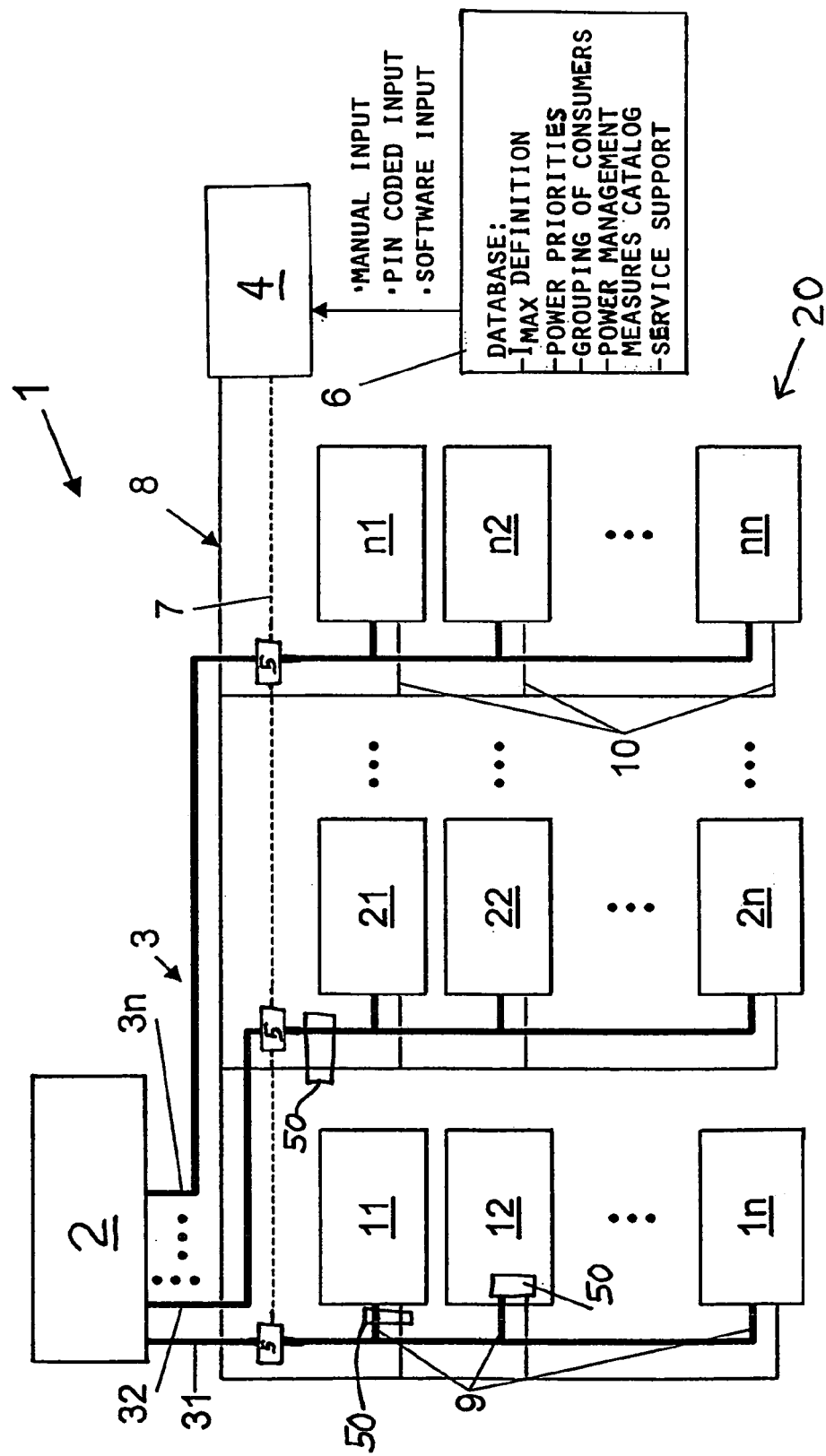
FIG. 1 is a schematic block diagram of an electrical power supply arrangement according to the invention.

The block diagram of FIG. 1 provides a schematic overview of an energy or power supply arrangement 1 for supplying electrical power to electrical consuming devices 11, 12, ... 1n, 21, 22, ... 2n and n1, n2, ... nn of an on-board galley 20 of a passenger transport aircraft. The electrical power or energy available for use in the galley 20 is typically limited, and is provided by a current source, or in general an electrical power source 2. A power distribution network 3 includes a plurality of power supply circuits or branch feeder lines 31, 32 . . . 3n, to which the electrical consuming devices 11 ... 1n, 21 ... 2n and n1 ... nn are connected by individual associated connection or branch lines 9, so as to supply the respective required power or current to each individual electrical consuming device.

The arrangement 1 further includes a control unit 4 to monitor and control the supply of power through at least one of the power supply circuits 31, 32 or 3n, or preferably through all of the power supply circuits serving the galley 20. Particularly, the control unit 4 monitors and evaluates the actual presently existing current consumption $I_{actual}$ or power consumption of the connected electrical power consuming devices 11 . . . 1n, 21 . . . 2n and n1 . . . nn, and ensures that the actual current does not exceed a maximum permissible current consumption value $I_{max}$ of the connected consuming devices. The actual presently existing current consumption value $I_{actual}$ is measured by a measuring unit 5 arranged directly within the power distribution network 3, and preferably respectively within an associated individual power supply circuit 31, 32 or 3n, or directly in or on an individual one of the connection or branch lines 9, or connected to an individual one of the electrical consuming devices 11 . . . 1n, 21 . . . 2n, and n1 . . . nn. With such individual measuring units 5 associated with individual power distribution circuits or individual consuming devices, the total power consumption or current consumption for a given circuit or for the total distribution network can easily be determined by adding or summing the several measured values.

The determined actual current value $I_{actual}$ is then provided via a data line 7 to the control unit 4. The data line 7 can be a component of a databus system 8, which connects the control unit 4 to all of the electrical consuming devices 11 to 1n, 21 to 2n, and n1 to nn. Within the control unit 4, the actual current value $I_{actual}$ is compared to the maximum current value $I_{max}$, and particularly the difference between the maximum current value $I_{max}$ and the actual current value $I_{actual}$ is determined, preferably repetitively at a prescribable fixed clock cycle, for example based on a sampling and comparison every 50 ms. The maximum current value $I_{max}$ has been previously prescribed or specified, based on the maximum possible supply power that can be delivered by the power source 2 via the power distribution network 3. Particularly, for example, the maximum current value $I_{max}$ is input into the control unit 4 either manually, via software, or by PIN coded input.

Depending on the result of the comparison or difference formation between the actual current value $I_{actual}$ and the maximum current value $I_{max}$, a corresponding reaction is triggered within the control unit 4, namely for example, the control unit 4 issues a control command dependent on and responsive to the result of the comparison or difference formation. In one mode of operation, as long as the actual current value $I_{actual}$ remains smaller than the maximum current value $I_{max}$, no special control command is issued, i.e. no special measures or procedures are initiated, and particularly the power distribution is not altered or controlled, but instead full power use remains available to all of the connected devices. However, in another operating mode or embodiment, preventive measures are already taken before the actual current value $I_{actual}$ increases to and reaches the maximum current value $I_{max}$, in order to prevent the actual current from reaching the maximum current value. For example, this can involve specifying a warning threshold or preventive measure threshold current value, and triggering suitable preventive measures (as will be described below) in the event the actual current value reaches the warning or preventive measure threshold value. Alternatively, this can involve evaluating the difference between the actual current value and the maximum current value, and initiating suitable preventive measures when this determined difference becomes smaller than a desired power headroom or safety margin value.

If the actual current value $I_{actual}$ becomes larger or greater than the maximum current value $I_{max}$, then the control unit 4 activates suitable reactive measures in order to again reduce the actual current value $I_{actual}$ until it becomes smaller than (or equal to) the maximum permissible current value $I_{max}$. The various available power management measures or procedures and combinations and sequences of such measures or procedures to be carried out are stored as a measures or procedures catalog, preferably in the form of a software program, in a databank or database 6 that is connected to the control unit 4. The power management measures or procedures specified in the catalog can be called up from the database 6 by the control unit 4 as needed. Particularly, the measures or procedures catalog includes or defines process sequences or switching sequences that are executed and carried out respectively under certain specified conditions.

For example, when the actual current value $I_{actual}$ exceeds the maximum current value $I_{max}$, the control unit 4 can call up and execute measures from the measures catalog that define a process sequence whereby the power delivered to all of the individual consuming devices 11 to 1n, 21 to 2n, or n1 to nn, and thus the power consumption thereof, is reduced in a step-wise manner, while re-evaluating the actual current value after each power reduction step, until the actual current value $I_{actual}$ has again fallen below the maximum permissible current value $I_{max}$. Such a power reduction in a step-wise manner, instead of being applied to all of the consuming devices 11 to 1n, 21 to 2n, and n1 to nn can alternatively be coupled with an evaluation of power supply priorities assigned to the individual consuming devices, so that the step-wise power reduction is only applied to consuming devices with a low priority. Then, the power reduction will be applied step-wise to consuming devices having successively higher priorities only if and to the extent that the actual current value cannot be reduced below the maximum current value by reducing the power of only the lower priority devices. Further particular examples of different process sequences for managing the energy or power distribution by way of respective measures or procedures defined in a catalog are illustrated and described further below in connection with FIGS. 3 to 5.

For carrying out the above power consumption reducing measures, by suitably controlling the individual power consuming devices, the control unit 4 is connected with each consuming device 11 to 1n, 21 to 2n, and n1 to nn via the databus 8 and individual data distribution lines 10. In order to allow the control unit 4 to provide respective control signals selectively to a single selected one of the consuming devices, or selected groups or sets of the consuming devices, via the databus system 8, each consuming device 11 to 1n, 21 to 2n, and n1 to nn is provided with an address code, and the control unit 4 directs each issued control signal to the appropriate selected device or devices by means of the respective associated address code or codes of the device or devices. The addressing protocol can be carried out in accordance with any conventionally known addressing systems and methods.

Particularly in the present case, when the control unit 4 determines that the actual current value exceeds the maximum permissible current value, the control unit 4 calls up and executes a suitable process sequence from the measures catalog stored in the database 6, and then issues one or more control commands or signals with suitable address codes via the databus 8 to one or more selected or targeted ones of the consuming devices 11 to 1n, 21 to 2n, and n1 to nn. Upon receiving the control command or signal, the respective addressed consuming device 11 to 1n, 21 to 2n or n1 to nn modifies its power consumption by means of suitable power control circuitry. Any conventionally known power switch 50 or power control circuitry 50 can be incorporated in the device (e.g. shown in device 12), or interposed in the respective branch line 9 (e.g. shown for the device 11), or interposed in the branch circuit (e.g. shown in the branch circuit 32), such that the switch or circuit 50 receives the control commands and accordingly controls the supply of power to the associated device or devices. For example, in the present embodiment, the power consumption of the respective device is reduced responsive to the corresponding control command or signal. This power reduction can be carried out in a step-wise manner or in a continuous step-less manner, depending on and responsive to the issued control command.

The measures or procedures being carried out for reducing the power consumption advantageously have been designed to taken into consideration the typical utilization patterns and sequences of using the various power consuming devices in the galley 20 during a meal service or catering process in the aircraft. Thereby, the power reduction and management can be carried out to avoid a power consumption overload, while being essentially or entirely unnoticeable by the user of the galley 20, or at least so as to carry out the required power reduction without having a negative effect on the food service processes that must be carried out in the galley 20.

By continuing to monitor the actual current consumption $I_{actual}$, even after the required power reduction has been achieved, the present arrangement will then discontinue the power management control commands or provide a new control signal to the power consuming devices, or the particular selected device or devices 11 to 1n, 21 to 2n or n1 to nn, whereby the power consumption of this device or these devices is again increased to the normal full power operating level in a direct step-less manner or step-wise, to the extent that the increased power consumption does not exceed the maximum permissible current value.

With the above described solution, it is possible to provide an "intelligent" management and distribution of the current or power resources that are available at any given time, so as to achieve an optimum functionality of the various devices 11 to 1n, 21 to 2n and n1 to nn available to the user in the on-board aircraft galley 20. With the inventive arrangement and method, it is not necessary to completely switch off certain devices, which would interrupt or interfere with the normal orderly progress of the catering or meal service. A temporary or intermittent power reduction of individual ones of the devices or even all of the devices will possibly not even be noticed by the user of the galley, or at least will not be problematic or hinder the use of the devices. An overloading of the power supply system is reliably prevented, which thus prevents the possible tripping of a protective circuit breaker or the like, and further achieves improved safety and reliability in compliance with the various safety regulations that apply to the electrical power supply system of an aircraft. As a result, a reliable functionality of the electrical devices of the on-board aircraft galley, and therewith an optimum support of the meal and beverage service to the aircraft passengers are achieved.

As described above, for carrying out the orderly power reduction and overall power management, the database 6 stores a catalog of various available measures or procedures, as well as relative priority values assigned to the several power consuming devices. Moreover, the database 6 may store or provide additional data, such as the definition of the maximum power or current value, groupings of the power consuming devices into functionally related groups, address codes for the various devices and/or groups, service support information, etc. As an example, it is possible for the control unit 4 to directly access the individual consuming devices 11 to 1n, 21 to 2n or n1 to nn to obtain a condition or status report regarding the operating status of the device, and then to supply this status information to the database 6 where it may be stored. Such status informations can be stored in a central form for a given supply circuit 31, 32 or 33, or for the entire on-board galley 20. For this purpose, the power consuming devices, such as the devices 21 to 2n, are equipped with or include suitable information transducer arrangements for example comprising sensors and circuitry adapted to detect various operational status information such as the operating status ON, OFF, STANDBY, or FAULT/ERROR, and to transmit such status information to the control unit 4. With this information, for example, the operating duration of a particular electrical device can be detected, recorded in an operating protocol, and stored in the database 6, which is then useful for maintenance and repair purposes of the devices, and can also be used for revising the measures or procedures of the measures catalog discussed above. Also, various faults or malfunctions of devices can be better recognized, recorded, monitored and then corrected using such a detection and protocoling system.

Figure 2:
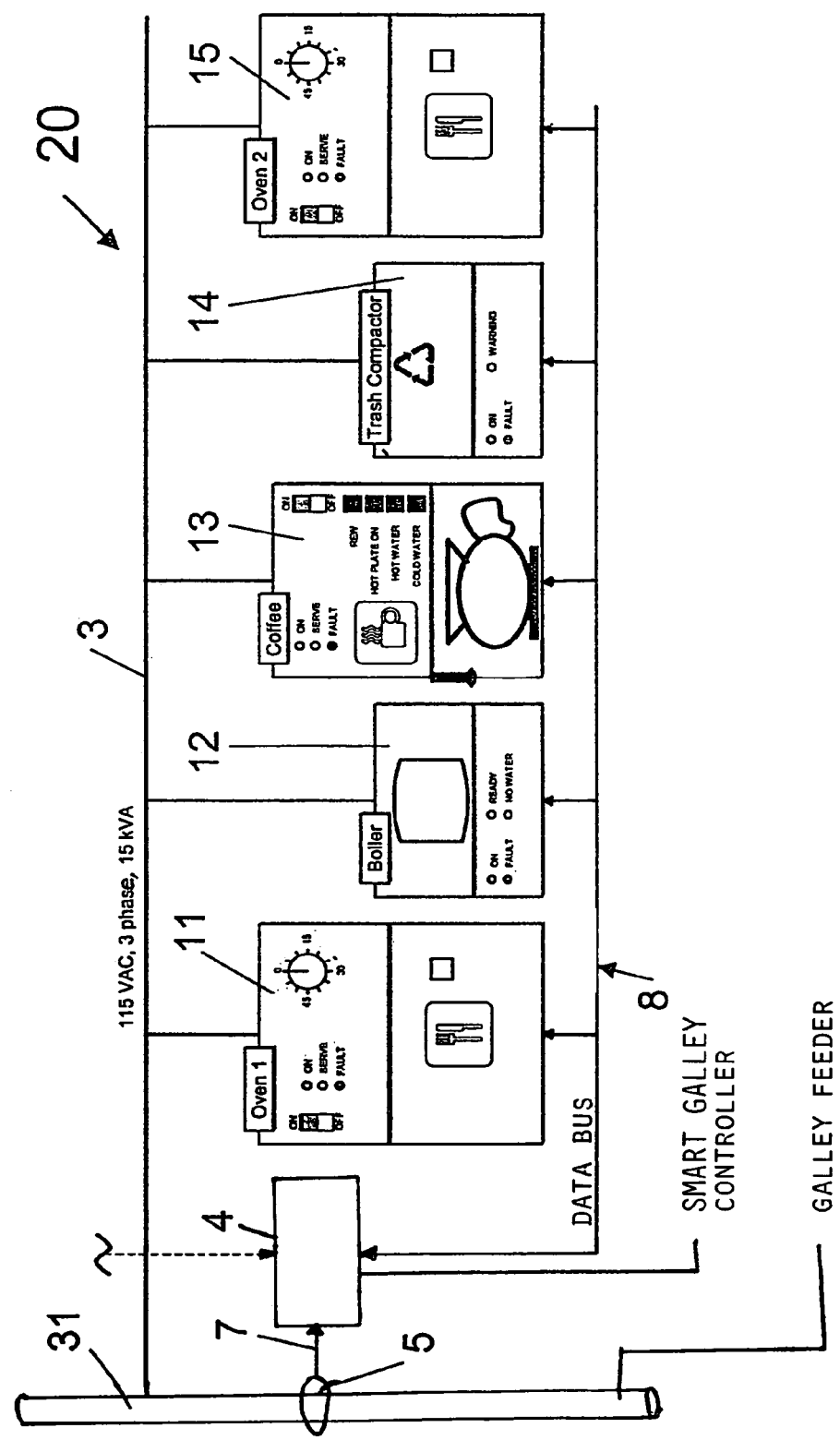
FIG. 2 is a schematic block diagram of a power supply circuit for electrical consuming devices in an on-board galley in a passenger transport aircraft.

FIG. 2 schematically depicts a portion of an on-board aircraft galley 20 of a passenger transport aircraft. The particular electrical power consuming devices are here represented by ovens 11 and 15, a water boiler 12, a coffee or tea making machine 13, and a trash compactor 14, which are each connected to the power distribution network 3, and particularly a galley feeder circuit 31, to provide electrical power to these devices. The control unit 4 is represented by a so-called smart galley controller 4, which is connected via the databus 8 to the electrical consuming devices 11 to 15, so as to transmit suitable control signals to these devices, as described above, and in further detail below.

It can be recognized that the devices 11 to 15 may be of various different types, whereby also the respective power consumption and power use duration of the individual devices differs from one another. For example, the ovens 11 and 15 have a high power consumption for a relatively long duration while they are heating-up and then a somewhat lower power consumption when they are holding passenger meals at a set achieved temperature. On the other hand, the water boiler 12 and coffee maker 13 have a power consumption (lower than that of the ovens) during a water heating or brewing phase, and a still lower power consumption during a holding phase. The trash compactor 14 operates only intermittently with a lower power consumption.

Various different examples of power reduction process sequences for managing the power distribution in different embodiments are illustrated in FIGS. 3 to 5. These various measures are carried out by the control unit 4 when the actual presently existing current value $I_{actual}$ is greater than the maximum permissible current value $I_{max}$, in order to again reduce the actual current value $I_{actual}$ to below the maximum current value $I_{max}$. Alternatively, or additionally, suitable preventive measures are carried out before the actual current value reaches the maximum current value, so as to prevent the actual current value $I_{actual}$ from reaching the maximum current value $I_{max}$.

The power versus time diagram of FIG. 3 illustrates a "time-sharing" power distribution process or measures to prevent the total power consumption from exceeding a maximum total power consumption $P_{max}$. Particularly, a staggered and time-interleaved switching-on or operation of various different electrical power consuming devices allows a time-sharing of the available power resources without exceeding the maximum available power $P_{max}$.

As an example, the diagram of FIG. 3 illustrates the energy distribution and supply to consuming devices such as the oven 11, the coffee machine 13, and the trash compactor 14 dependent on time, in the power supply circuit of an on-board galley 20. The control unit 4 provides the necessary control signals to the several devices 11, 13 and 14 to control the operation thereof, e.g. the switching-on and the switching-off of the several devices in a managed way. Thus, for example, even if a user of the galley 20, such as a flight attendant, simultaneously switches on all of the electrical devices 11, 13 and 14, the actual operation of the devices will be controlled by the control unit 4, so that the highest priority oven 11 first receives all of the power required for its initial heating-up phase 40. Once the heated operating temperature of the oven 11 is reached, the power supply to the oven 11 may be cycled on and off by means of a two-point regulation 41, so as to operate the oven 11 in a temperature holding or temperature keeping phase made up of alternating cyclical power-on phases and power-off phases 43.

In the power-off phases 43 in which no power is provided to the oven 11, the available power resource can be used to operate consuming devices with a lower power consumption and/or a shorter operating time. For example, such short time or intermittent consuming devices include the coffee machine 13 and the trash compactor 14. Thus, the control unit 4 will switch-on the coffee maker 13 and then the trash compactor 14 during successive power-off phases in the operation of the oven 11. Since the required power-on operating time of the other devices may exceed the duration of a single normal power-off phase 43 of the operation of the oven 11, the control unit 4 can activate a longer-duration power-off phase or simply additional power-off phases 42 or 44 instead of or in addition to the typical normal power-off phases 43 during the two-point regulation 41 of the operation of the oven 11.

More particularly, the switch-on and switch-off signals for the coffee machine 13 and/or the trash compactor 14 are issued by the control unit 4 under consideration of the operating condition of the device selected by the user (i.e. the switched-on or switched-off state of the device), as well as the respective priority assigned to the particular device, and also the existing power-off phases 43 of the operation of the oven 11. In this manner, a consuming device having a higher switching priority, here for example the coffee machine 13, is switched-on before the lower-priority trash compactor 14, in a power-off phase 42 during which the oven 11 is not receiving power in the two-point regulation 41 thereof. In this example, the power-off phase 42 of the oven is extended to a time corresponding to the necessary operating time of the coffee machine 13, which is longer than the normal power-off phase 43 of the oven during its two-point temperature regulation 41. It is recognized that the operating temperature of the oven 11 will temporarily sink below its intended temperature holding level, and the proper heating will again only be started once the coffee brewing process of the coffee machine 13 has finished. However, such a temporary and minimal reduction of the temperature of the oven 11 will not be noticeable or will not be regarded as problematic by the user of the oven. On the other hand, the trash compactor 14 can be operated through a complete operating cycle with power supplied during a power-off phase 44 of the oven, with a duration corresponding to the normal power-off phases 43, because the operating cycle of the trash compactor 14 is relatively short, and thereby the normal temperature-holding operation of the oven 11 is not influenced at all.

The control of these time-sharing measures is automatically carried out by a computer processor within the control unit 4. A user of the galley 20, such as a flight attendant, who switches on the various electrical devices simultaneously at a certain time or within a short time interval of each other, as required for carrying out the catering or food service process, will not even notice the execution of the power management measures. Namely, the user of the devices will simply switch on the selected device as desired in the usual manner, but then the actual operation of the device (i.e. the actual supply of operating power to the device) will be controlled in accordance with the appropriate power management measures by the control unit 4. This will result in imperceptible time sequencing or interleaving of the operation of the devices, or only slight delays in the interleaved operation of the devices. It is further possible, for example, that at the beginning of a catering or food service process, a central control is actuated to simultaneously switch on the oven 11 as well as the coffee machine 13 and/or the water boiler 12, whereupon an automatic operating sequence of the devices is then carried out, for example in accordance with FIG. 3, by means of a managed distribution of the power to these devices, without any further action by the user of the devices.

FIG. 4 schematically illustrates a further example of a process sequence for carrying out a power distribution in the manner of "power sharing". Particularly, FIG. 4 shows the power distribution within a power supply circuit of a galley 20, among consuming devices such as the oven 11, the water boiler 12, and the trash compactor 14, dependent on time. The control unit 4 provides appropriate control signals so that first the oven 11 is provided with the required power for its heating-up phase 40. Once the oven 11 reaches its intended operating temperature, then the oven 11 is switched to a temperature holding or temperature keeping phase 45, during which the power supplied to the oven can be reduced at least for temporary phases or intervals. In the illustrated example, the power supplied to the oven 11 is reduced by 50% during power reduction phases 46.

During these phases 46, the additional available power (which is now not being provided to the oven 11) can be used for supplying other consuming devices that operate for short durations and/or with a lower power consumption, without exceeding the maximum current value or a maximum permissible power consumption. For example, the water boiler 12 is operated during the first power-reduction phase 46 of the oven 11, while the trash compactor 14 is operated during the second power reduction phase 46 of the oven 11. In this manner, the heating temperature of the oven 11 can still be maintained without any interference, and the coffee maker 12 and the trash compactor 14 can also be operated normally. This process sequence of the control of the power distribution is executed automatically by the control unit 4 by issuing appropriate control commands to activate power control circuits or power control switches of the various devices as discussed above, without requiring any active steps by the user of the galley 20.

FIGS. 5A and 5B schematically illustrate a further process sequence for power management to avoid or reduce power consumption peaks in a power supply circuit of the on-board galley 20. FIG. 5A shows a typical conventional utilization and operation of four ovens 111, 112, 113 and 114 during a catering or meal service process in an aircraft galley. In the conventional un-managed operation, the ovens 111 to 114 are all switched on simultaneously, and all four ovens will simultaneously draw their maximum required power for the initial heat-up phase 40. Typically, the passenger meals are heated in a time interval of about 25 minutes, whereby approximately the first seven minutes are taken up by the heating-up phase 40 of the ovens.

Due to the limited capacity of distributing meals to the passengers through the use of trolleys, the meal service is necessarily carried out in successive "waves". Namely, for example, the heated meals are taken out of the oven 111, loaded into trolleys and distributed, while the heated meals in the ovens 112, 113 and 114 remain for a longer time in these ovens. Then, after the first "wave" of meals from the oven 111 has been distributed, the next "wave" of meals is loaded from the oven 112 into the trolleys and distributed to the passengers, and so on. During this additional time, the remaining meals must be kept warm in the ovens 113 and 114. In other words, the ovens are kept warm with a reduced power consumption during a relatively long standby time until the meals are actually removed from the respective oven and distributed. As can be seen in FIG. 5A, all of the ovens are drawing maximum power during the first seven minute heating-up phase 40, and all continue to draw power during the entire 25 minute meal heating time. The ovens 112, 113 and 114 continue to draw additional holding power during the standby time until the meals are removed from each individual oven.

FIG. 5B schematically represents a power distribution management according to the invention achieving a power peak compression, in comparison to the typical conventional power utilization according to FIG. 5A discussed above. In FIG. 5B, even though the user simultaneously switches on all of the ovens 111 to 114, the control unit 4 actually provides power to the respective ovens in a time-staggered manner so as to operate the ovens in a time-staggered manner. While the first oven 111 is being operated in its heating-up phase for about 7 minutes, no other oven 112 to 114 is being provided with power yet, and it is only necessary to provide the power for operating this single oven 111.

Then, when the first oven 111 has reached its operating temperature and transitions into a temperature maintaining phase 45, the power supplied to this oven can be partially reduced (see e.g. power reduction phase 46 in FIG. 4) or the power is cycled on and off (e.g. according to a two-point regulation 41 according to FIG. 3), whereby an overall reduced power is consumed by the first oven 111. During this temperature maintaining phase 45 of the first oven 111, the second oven 112 is provided with power, and particularly with its required full power for carrying out its heating-up phase 40. The third oven 113 and the fourth oven 114 are switched on or provided with power in a further time-staggered manner, whereby, for example, the fourth oven 114 is only switched on with its full power heating-up phase after 21 minutes, when the first oven (111) is already nearing completion of its total meal heating operation.

In this manner, through the time-staggered operation of the ovens, the power consumption peaks are reduced or avoided, the total power consumption is reduced by avoiding unnecessarily long meal holding times, and the physical service or distribution of the meals is not influenced at all, because the time-staggered distribution of the meals in successive "waves" or trolley loads is typical in the conventional service of the passengers.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An on-board galley arrangement in a passenger transport aircraft, comprising:
   an electrical power source;
   electrical power consuming devices installed in a galley of the aircraft;
   a power distribution network connecting said electrical power source to said power consuming devices;
   a control unit;
   a databus connected to said control unit and to each one of said power consuming devices; and
   a database that is connected to said control unit and that stores a catalog of power management measures;
   wherein said control unit is adapted to compare an actual power consumption of a single one or a group or all of said power consuming devices to a prescribed maximum power consumption value, and if said actual power consumption reaches or exceeds said maximum power consumption value, to call up one or more of said power management measures of said catalog stored in said database and to transmit via said databus at least one control command corresponding to and dependent on said one or more power management measures to one or more of said power consuming devices that are identified individually by an address code; and
   wherein each one of said power consuming devices respectively includes an information transducer arrangement that is adapted to transmit status information regarding an operating status of the respective said power consuming device via said databus to said control unit, which is adapted to store said status information in a status report for the respective said power consuming device in said database.

2. The on-board galley arrangement according to claim 1, wherein said power consuming devices include devices selected from the group consisting of ovens, water boilers, coffee maker machines, and trash compactors.

3. The on-board galley arrangement according to claim 1, further comprising power control devices respectively arranged in said power consuming devices, or interposed in said power distribution network, or connected between said power distribution network and said power consuming devices, and connected to said databus to receive said at least one control command and to control a delivery of electrical power from said electrical power source to said one or more of said power consuming devices in response to and dependent on said at least one control command.

4. The on-board galley arrangement according to claim 1, wherein said actual power consumption comprises an actual current consumption, and said prescribed maximum power consumption value comprises a prescribed maximum current consumption value.

5. The on-board galley arrangement according to claim 4, further comprising at least one current measuring unit arranged and adapted to measure said actual current consumption.

6. The on-board galley arrangement according to claim 5, further comprising a data line connecting said current measuring unit with said control unit.

7. The on-board galley arrangement according to claim 5, wherein said current measuring unit is interposed in a power supply branch circuit of said power distribution network to measure said actual current consumption as an actual total current consumption of a plurality of said power consuming devices that are all connected to said power supply branch circuit.

8. The on-board galley arrangement according to claim 5, wherein said at least one current measuring unit comprises plural current measuring units respectively connected individually to individual ones of said power consuming devices to measure said actual current consumption as plural individual current consumptions of said individual ones of said power consuming devices, and wherein said plural individual current consumptions are summed together in said control unit.

9. The on-board galley arrangement according to claim 1, wherein said power management measures include preventive measures, and said control unit is further adapted to call up said preventive measures and to transmit at least one preventive control command corresponding to and dependent on said preventive measures to one or more of said power consuming devices if said actual power consumption is in a defined range below said maximum power consumption value.

10. The on-board galley arrangement according to claim 1, wherein said power management measures include an overall power reduction procedure, and wherein said at least one control command corresponding to said overall power reduction procedure carries out a step-wise reduction of power consumption by all of said power consuming devices.

11. The on-board galley arrangement according to claim 1, wherein said power management measures include a prioritized power reduction procedure, said database further stores priority values respectively allocated to said power consuming devices, and said at least one control command corresponding to said prioritized power reduction procedure is adapted to carry out a step-wise reduction of power consumption by only some of said power consuming devices selected based on said priority values allocated thereto.

12. The on-board galley arrangement according to claim 1, wherein said power management measures include a time-staggered operation procedure, and said at least one control command corresponding to said time-staggered operation procedure is adapted to carry out a time-staggered supply of electrical power to selected ones of said power consuming devices.

13. The on-board galley arrangement according to claim 1, wherein said at least one control command is adapted to cause a reduction of power supplied to said one or more of said power consuming devices, and when said actual power consumption falls below said maximum power consumption then said control unit is adapted to discontinue transmitting said at least one control command.

14. A method of distributing electrical power to a plurality of electrical power consuming devices, comprising the steps:
 a) storing a catalog of power management measures in a database;
 b) providing a predetermined maximum current consumption value;
 c) measuring an actual current consumption value of one or more of said power consuming devices;
 d) comparing said actual current consumption value to said maximum current consumption value;
 e) if said comparing in said step d) determines that said actual current consumption value equals or exceeds said maximum current consumption value, then calling up at least one of said power management measures from said catalog, and issuing at least one control command corresponding to and dependent on said at least one of said power management measures;
 f) transmitting and providing said at least one control command via a databus to a selected one or selected group of said power consuming devices;
 g) in response to and dependent on said at least one control command, either switching-on a supply of power to, or switching-off a supply of power to, or reducing a power consumption of, said selected one or said selected group of said power consuming devices;
 h) transmitting on said databus from a respective one of said power consuming devices, status information regarding an operating status of said respective power consuming device; and
 i) storing said status information in a status report for said respective power consuming device in said database.

15. The method according to claim 14, wherein said power consuming devices are food preparation devices in an on-board galley in a passenger transport aircraft.

16. The method according to claim 14, wherein said catalog further includes preventive measures, and further comprising a step of calling up at least one of said preventive measures from said catalog, and issuing and transmitting to a chosen one or a chosen group of said power consuming devices at least one preventive command dependent on said at least one preventive measure, if said comparing in said step d) determines that said actual current consumption value is in a specified range below said maximum current consumption value, and then reducing a power consumption of said chosen one or said chosen group of said power consuming devices in response to and dependent on said at least one preventive command.

17. The method according to claim 14, wherein said power consuming devices include a first device that has a first operating phase with a higher power requirement and a second operating phase with a lower power requirement, and wherein said step g) comprises continuously supplying power to said first device during said first operating phase and intermittently supplying power to said first device by alternately switching-on said power in power-on phases and switching-off said power in power-off phases during said second operating phase, and supplying power to a second device among said power consuming devices only during at least one of said power-off phases of said first device and not during said power-on phases of said first device.

18. The method according to claim 17, wherein said first device is an oven in an aircraft galley, and said second device is one of a coffee maker, a water boiler, and a trash compactor in said aircraft galley.

19. The method according to claim 14, wherein said power consuming devices include a first device that has a first operating phase with a higher power requirement and a second operating phase with a lower power requirement, and wherein said step g) comprises supplying a higher level of power to said first device during said first operating phase and supplying a lower reduced level of power to said first device during at least one reduced power phase of said second operating phase, and supplying power to a second device among said power consuming devices only during at least one said reduced power phase of said second operating phase of said first device and not during said first operating phase of said first device.

20. The method according to claim 19, wherein said first device is an oven in an aircraft galley, and said second device is one of a coffee maker, a water boiler, and a trash compactor in said aircraft galley.

21. The method according to claim 14, wherein plural ones of said power consuming devices are manually switched on simultaneously or within a given time span, and said step g) comprises automatically switching on said supply of power to said plural ones of said power consuming devices in a time-staggered succession extending in time after said given time span.

22. The method according to claim 21, further comprising reducing said supply of power to a first one of said plural power consuming devices before switching on said supply of power to a second one of said plural power consuming devices.

23. The method according to claim 21, wherein said plural power consuming devices are ovens in a galley of an aircraft.

* * * * *